(12) United States Patent
Roesgen et al.

(10) Patent No.: US 10,179,302 B2
(45) Date of Patent: Jan. 15, 2019

(54) FILTER SYSTEM COMPRISING COUPLING DEVICE

(71) Applicant: MANN+HUMMEL GMBH, Ludwigsburg (DE)

(72) Inventors: André Roesgen, Remshalden (DE); Robert Hasenfratz, Waiblingen (DE); Fabian Wagner, Moeglingen (DE); Christian Thalmann, Speyer (DE); Frank Pflueger, Sachsenheim (DE); Petra Skorpíková, Našimerice (CZ)

(73) Assignee: MANN+HUMMEL GmbH, Ludwigsburg (DE)

( * ) Notice: Subject to any disclaimer, the term of this patent is extended or adjusted under 35 U.S.C. 154(b) by 41 days.

(21) Appl. No.: 15/253,406

(22) Filed: Aug. 31, 2016

(65) Prior Publication Data

US 2017/0014739 A1    Jan. 19, 2017

Related U.S. Application Data

(63) Continuation of application No. PCT/EP2015/050994, filed on Jan. 20, 2015.

(30) Foreign Application Priority Data

Jan. 23, 2014 (DE) .......... 10 2014 000 717
Feb. 20, 2014 (DE) .......... 10 2014 002 239

(51) Int. Cl.
*B01D 29/96* (2006.01)
*B01D 35/30* (2006.01)
(Continued)

(52) U.S. Cl.
CPC ............ *B01D 29/96* (2013.01); *B01D 27/08* (2013.01); *B01D 35/005* (2013.01); *B01D 35/30* (2013.01);
(Continued)

(58) Field of Classification Search
CPC .... B01D 35/005; B01D 35/30; B01D 35/306; B01D 29/96; B01D 2201/347;
(Continued)

(56) References Cited

U.S. PATENT DOCUMENTS 5,045,192 A * 9/1991 Terhune ................. B01D 29/15
                                                            210/232
5,284,579 A * 2/1994 Covington ............. B01D 27/08
                                                            210/130
(Continued)

FOREIGN PATENT DOCUMENTS

DE    102010035465 A1    2/2012

OTHER PUBLICATIONS

Century Spring, Wave Disc Springs, accessed Dec. 10, 2017. (Year: 2017).*

*Primary Examiner* — Claire A Norris
*Assistant Examiner* — Julia L. Wun
(74) *Attorney, Agent, or Firm* — James Hasselbeck

(57) ABSTRACT

A filter system has a filter element in a filter housing having a coupling device configured to detachably couple and mount the filter system onto a receiving member external to the filter system. The coupling device has one or more inwardly projecting coupling elements which lockably engage with coupling contours of the receiving member by a sliding-rotating movement.

13 Claims, 17 Drawing Sheets

(51) Int. Cl.
  *B01D 27/08* (2006.01)
  *B01D 35/00* (2006.01)
(52) U.S. Cl.
  CPC .. *B01D 2201/304* (2013.01); *B01D 2201/347* (2013.01); *B01D 2201/4015* (2013.01)
(58) Field of Classification Search
  CPC ...... B01D 2201/304; B01D 2201/4015; B01D 2201/30; B01D 2201/301; B01D 2201/305; B01D 2201/31; B01D 2201/40; B01D 2201/4023; B01D 2201/4046; B01D 2201/4053; B01D 27/08
  USPC .......... 210/232, 238, 236, 249, 250, 167.01, 210/167.02, 167.08, 172.6
  See application file for complete search history.

(56) References Cited

U.S. PATENT DOCUMENTS

| | | | |
|---|---|---|---|
| 5,490,930 A | | 2/1996 | Krull |
| 6,023,834 A | * | 2/2000 | Brown ................... B21D 51/32 220/619 |
| 6,096,208 A | | 8/2000 | Theisen |
| 2008/0308487 A1 | | 12/2008 | Thienel |
| 2013/0327699 A1 | * | 12/2013 | Gaenswein ............ B01D 29/58 210/335 |

* cited by examiner

FILTER SYSTEM COMPRISING COUPLING DEVICE

TECHNICAL FIELD

The invention relates to a filter system for filtering a fluid, having a coupling device, in particular for use as a fuel filter of an internal combustion engine.

BACKGROUND

It is known that one of the challenges in the design of replaceable filter systems is to create a reliable attachment and seal on a receiving means to which the filter system is attached. The mechanical interfaces should have as simple a design as possible, yet be robust and reliable. It should be possible to repeatedly replace the filter system as simply, quickly and unproblematically as possible. Moreover, it is intended to cover a plurality of installation situations having similar solutions in order to be able to provide cost-effective filter systems.

Fuel filters normally use a disposable filter element that is replaced after predetermined filter usage time intervals. The disposable element is conventionally attached to the base structural component of the filter via a retaining or latching mechanism that is releasable so as to permit the removal of the element for replacement purposes. There is a plurality of conventional base part retention systems for fuel filter elements. Many such retaining systems are very inconvenient to use or even fail after a time because of the harsh environment surrounding the fuel filter insert.

U.S. Pat. No. 5,302,284 A describes a filter structure that includes a base part, a filter element attachable to the base part and a retaining collar for attachment of the filter element to the base part. The collar holds a wave spring which is retained between spaced-apart shoulders of the collar. The base part forms a receiving means device for holding the head of the filter element. A ramp and a catch, which is adjacent to the end of the ramp, are arranged in front of the base part. The retaining collar further includes a cam which has a detent. The cam is engageable with the ramp, so that if the collar is turned at an angle, the cam moves on the ramp and the detent engages in the catch under the prestress of the spring in order to lock the filter element on the base part.

SUMMARY

One object of the invention is therefore to create a filter system for filtering a fluid that provides a robust and cost-effective option for ensuring a reliable, releasable retention of the filter system on a retaining part that is external to the filter system. Moreover, reliable sealing of the filter system to the retaining part and between inlet and outlet should be provided.

The aforesaid object is achieved according to one aspect of the present invention by a filter system in which a coupling device provides one or a plurality of coupling elements which are at least partially insertable in an axial direction into a coupling contour arranged within a receiving means by a push-turn movement in order to thereby keep the filter system in an end position and to lock it.

Beneficial embodiments and advantages of the invention result from the further claims, the description, and the drawing.

A filter system for filtering a fluid having an inlet and outlet at the end face is proposed that comprises at least one filter element, a filter housing, a coupling device for coupling the filter system to a receiving means external to the filter system and a seal holder having a seal for sealing the filter system at the receiving means. In this system, the coupling device provides one or a plurality of coupling elements which are at least partially insertable in an axial direction into a coupling contour arranged in the receiving means by a push-turn movement in order to thereby keep the filter system in an end position in the receiving means and to lock it. In other words, the coupling device is embodied as a quick coupling.

The filter system according to the present invention can be attached to the coupling device that is connected with a corresponding seal arrangement directly at a receiving means that is external to the filter system and is situated, for example, on a die-cast head of an internal combustion engine. In this arrangement, the filter system—which can be disposed hanging, standing or lying—is held at the receiving means with the coupling device. If the filter system is attached, it is helpful if the seal is joined directly to the filter system and, as a result, cannot fall out and/or be damaged. Advantageously, the seal holder can be connected to the coupling device.

The coupling device can be configured in the form of a bayonet joint so that the coupling element arranged at the coupling device can slide into a coupling contour located at the receiving means when the filter system is screwed into the receiving means and can slide into an end position when the filter system is turned further, as a result of which the filter system is locked into the receiving means.

This assembly procedure is expediently supported by a bracing element in the form of, for example, a compression spring that is attached to the coupling device and acts in the axial direction and, when the spring force of the bracing element is overcome, allows the filter system to slide into the end position and thereupon locks in this end position by virtue of the spring prestress. Then, to unscrew the filter system, the spring prestress must first be overcome again in order to allow the coupling element to slide out via the coupling contour and thereby enable the filter system to be removed from the receiving means.

The coupling device may expediently be made of a plastic, wherein for lower mechanical requirements thermoplastic materials, which permit a maximum surface pressure of up to 20 N/mm$^2$, can be used, whereas for higher mechanical requirements duromers, which permit a maximum surface pressure of up to 80 N/mm$^2$, can be used. Because the coupling elements are more heavily stressed when sliding in the coupling contour, duromers constitute a preferred embodiment. With these materials, the coupling elements may also be configured in any form that is advantageous for the structural design of the coupling device and the coupling contour. The receiving means may, for example, be made of die-cast aluminum, which has a higher strength than plastics, in particular a slightly higher strength than duromers, so that, even when a filter system is attached and replaced multiple times, no signs of wear can appear at the receiving means, which can be a component of the internal combustion engine.

A further advantage of the filter system according to the invention is that the bracing element in the form of, for example, a wave spring is not attached to the receiving means, which is indeed a part of the internal combustion engine, but is arranged on the coupling device. As a result, the structural form of the receiving means is more simply configured, and also the attachment of the bracing element is more flexibly configurable in the coupling device. Because the coupling device is designed in plastic, additional noses, for example, can be beneficially incorporated as retaining elements holding the bracing element and by means of which it could easily be inserted or even replaced.

Advantageously, the coupling device can thus comprise a bracing element, which in the installed condition stresses the filter system axially against the receiving means. The action of the bracing element makes for a quick-connect coupling in the form of, for example, a bayonet joint because the filter system can latch into the end position of the coupling contour by overcoming a prestress force of the bracing element.

Beneficially, the bracing element may provide at least two, in particular, for example, five raised points in the axial direction. On the one hand, the raised points are the means by which the prestress force of the bracing element is applied and, on the other hand, the raised points have the advantage that when there is a failure of a raised point due to, for example, a material breakage, additional raised points are present in order to still maintain the function in the form of the prestress force of the bracing element.

In one advantageous embodiment, the coupling device can be connected to the seal holder. This results in a stable and durable seal when the filter system is mounted on the receiving means. Furthermore, the secure connection of the seal holder to the filter housing also ensures that the coupling device is securely and stably connected to the housing.

Expediently, the coupling device may be provided with one or a plurality of retaining elements to hold the bracing element. In this way, the bracing element is favorably positionable in the coupling device and can easily be installed or even replaced if necessary if material fatigue or failure of the bracing element should occur.

Advantageously, the seal can be radially disposed, so that it radially seals the filter system in the installed state against the receiving means. Because the receiving means can suitably be designed as a connecting piece over which the filter system can slide and by which the intake and outlet of the filter system are also covered, the radial sealing of the filter system is appropriate and beneficial to ensure continuous functionality.

In one advantageous embodiment, the seal holder may be designed as the end-face closure of the filter system. Thus, a durable and stable seal at the end-face end of the filter housing is also providable. The one-piece seal holder, which is designed for instance as a metal sheet, can be connected to the filter housing by welding, gluing, crimping, or other joining methods in order to create a durably sealed and mechanically strong connection. In this instance, the contour for holding the seal can, for example, be produced by tapping, hydroforming, rolling, or similar forming methods, in order to create a one-piece seal holder that includes a U-shaped receiving means for the seal.

Beneficially, the seal holder can provide one or a plurality of connecting elements for connecting to the coupling device. The seal holder and the coupling device may be securely connected via these connecting elements, which can be designed, for example, in the form of hooks or clips. Such a connection may also be provided under certain circumstances even as a detachable connection if the connecting elements are designed, for example, as latching elements.

Expediently, the filter element can be arranged in the filter housing above a filter element holder that is supported at the coupling device. In this manner, the filter element can be securely and stably supported and possibly braced in the filter housing. Furthermore, a replacement of the filter element by removal of the filter element holder is also conceivable.

According to a further aspect, the invention relates to a combination of a filter system and a receiving means, and the receiving means having a coupling contour by means of which one or a plurality of coupling elements of a coupling device of the filter system is/are coupleable in an axial direction at least in part by a push-turn movement. Since the interfaces of the filter system with the seal holder and the coupling device correspond to and supplement the receiving means external to the filter system in terms of their functionality, it is advantageous if the combination—for instance, for material pairing, component surfaces, and joining methods—is matched to each another.

According to another aspect, the invention relates to the use of the filter system as a fuel filter. In this instance, the filter system can be used both as an exchangeable filter system and as a lifetime filter.

According to another aspect of the present invention, a filter system for filtering a fluid having an end-face inlet and outlet is suggested that includes at least one filter element, a filter housing, a quick coupling device for coupling the filter system to a receiving means external to the filter system, and a one-piece seal holder having a seal for sealing the filter system on the receiving means. The one-piece seal holder includes the seal essentially in a U-shape, and the one-piece seal holder being connected to the filter housing at an end-face edge of the filter housing.

The filter system according to the present invention can be sealed with the seal, for instance a one-piece O-ring seal that is U-shaped, that is, enclosed on three sides, in which the seal holder is arranged, directly against a receiving means external to the filter, which receiving means is seated, for instance, at a pressure die-cast head of an internal combustion engine. In this arrangement, the filter system—which can be disposed hanging, standing or lying—is held on the receiving means with the coupling device. If the filter system is screwed on, it is helpful if the seal is joined directly to the filter system and, as a result, cannot fall out and/or be damaged during assembly. Beneficially, the seal holder can be connected to the coupling device.

It is advantageous for the function of the filter system if the seal holder is hydraulically sealed against the environment, that is, the seal holder is tightly connected to the filter housing and the seal is also hydraulically tightly sealed against the seal holder. Normally standard leakages of a maximum of 0.5 Ncm$^3$/min are permitted in connection with test gases (for instance, helium or air under water). This means that the groove in the seal holder in which the seal is positioned has a high surface quality and typically must not have any striations greater than 0.1 mm, and roughness Rz for the groove must be less than 40 μm. The roughness Rz is the so-called averaged surface roughness, i.e., the average of the measured surface roughnesses.

The one-piece seal holder, which is designed for instance as a metal sheet, may be connected to the filter housing by welding, gluing, crimping, or other joining methods in order to create a durably sealed and mechanically strong connection. The contour for holding the seal may be produced for instance by tapping, hydroforming, rolling, or similar forming methods, in order to create a one-piece seal holder that includes a U-shaped receiving means for the seal.

When used properly, the seal may advantageously be positioned against the one-piece seal holder, at least radially and axially. The seal is guided by the one-piece seal holder and thus is disposed in a groove of the seal holder. The seal is situated from the inside. In this way the seal can seal both radially against a receiving means, for instance in the form of a connecting piece of an internal combustion engine, and axially against a wall of the seal holder, so that a reliable seal is provided even during heavy-duty use of a vehicle assembly position.

Beneficially, the seal may have an inward sealing function radial to a longitudinal axis. In this arrangement, the seal rests on a receiving means from outside and, in this way, seals the filter system to the receiving means against the environment.

In one advantageous embodiment, the one-piece seal holder may be embodied as the end-face closure of the filter system. In this way, the filter system is beneficially sealed at the end face and at the same time receives a mechanically reliable and lasting closure. The seal can thus beneficially seal the filter system to the receiving means.

In one advantageous embodiment, the one-piece seal holder may be connected to the coupling device in a material fit, non-positive fit, or positive fit. The seal holder may thus be welded, glued, or crimped to the coupling device, or, alternatively, it can also be clamped or clipped to the coupling device. Such a secure connection ensures that the sealing function is beneficially combined with the holding function and that, in doing so, also a lasting seal is provided when the filter system is mounted at the receiving means.

Beneficially, one or a plurality of connecting elements for connecting to the coupling device can be provided at the one-piece seal holder. Via this connecting element, the seal holder can be latched into the coupling device and, thus, a lasting and stable connection can be established.

In one advantageous embodiment, the coupling device may include a quick coupling. For instance, the coupling device may be embodied as a bayonet joint so that the filter system may be placed onto the receiving means and locked via a combined rotationally/pushing movement.

Advantageously, the coupling device may include a bracing element that in the installed condition braces the filter system axially against the receiving means. Especially when using a quick coupling like a bayonet joint, a bracing that holds the filter system in an end position of the bayonet joint is beneficial.

In one beneficial embodiment, the filter element can be arranged in the filter housing via a filter element holder that is supported against the coupling device. In this manner, the filter element can be braced in the filter housing and thus kept stable and secure, even during rough operating conditions like during motor vehicle operation.

According to another aspect, the present invention relates to a combination of a filter system and a receiving means, and the filter system having a one-piece seal holder having a seal for sealing the filter system at the receiving means. Since the interfaces of the filter system with the seal holder and the coupling device correspond to and supplement the receiving means external to the filter system in terms of their functionality, it is advantageous if the combination—for instance, for material pairing, component surfaces, and joining methods, are matched to each another.

According to another aspect, the invention relates to the use of the filter system as a fuel filter. The filter system may be used both as an exchangeable filter system and as a lifetime filter.

BRIEF DESCRIPTION OF THE DRAWINGS

Additional advantages result from the following description of the drawings. Exemplary embodiments of the invention are depicted in the drawings. The drawings, description, and claims include numerous features in combination. One skilled in the art will expediently consider the features individually and combine them into other appropriate combinations.

DETAILED DESCRIPTION

In the figures, identical or like components are assigned the same reference signs. The figures merely illustrate examples and shall not be construed as limiting.

Figure 1:
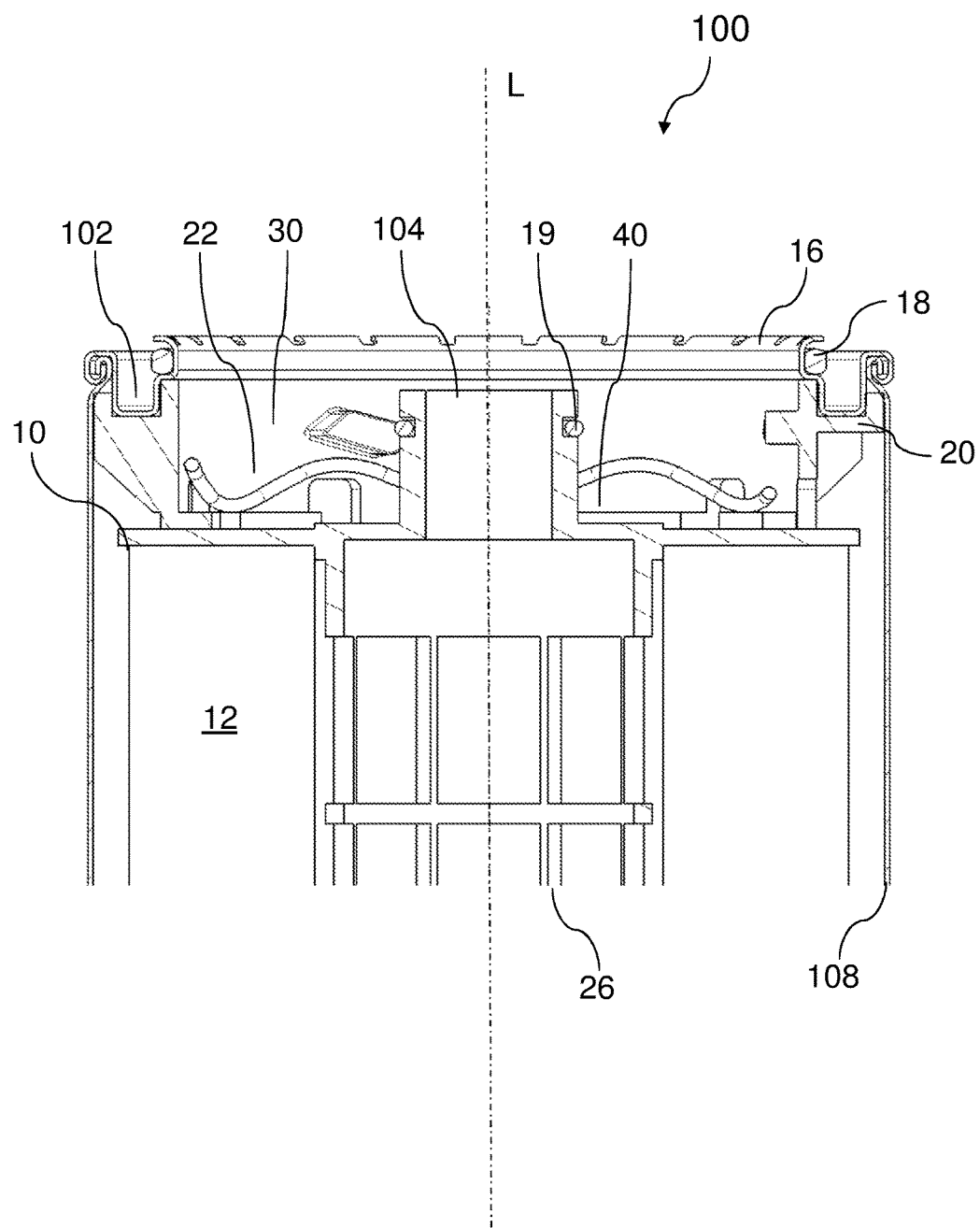
FIG. 1 is a sectional view of a filter system according to an exemplary embodiment of the invention.

FIG. 1 shows a sectional view of a filter system 100 according to an embodiment of the invention. Filter system 100 for filtering a fluid having an end-face inlet 102 and outlet 104 includes a filter element 10, a filter housing 108, a coupling device 30 for coupling filter system 100 to a receiving means 32 external to the filter system (depicted in FIG. 3), and a seal holder 16 having a seal 18 for sealing the filter system against receiving means 32. In this arrangement, coupling device 30 provides a plurality of coupling elements 36 that may be at least partially introduced in an axial direction L into a coupling contour 34 disposed within receiving means 32 by a push-turn movement in order to thereby keep filter system 100 in an end position 38 in receiving means 32 and to lock it. Coupling device 30 includes a bracing element 22 that when mounted axially braces filter system 100 against receiving means 32. In this arrangement, bracing element 22 provides at least two raised points 23 in the axial direction. Coupling device 12 is connected to seal holder 16, and seal holder 16 being designed as the end-face closure of filter system 100. Seal 18 is radially arranged so that, in the installed state, it radially seals filter system 100 against receiving means 32.

Cut-open filter element 10 has a hollow-cylindrical filter body 12 as an intrinsically filtering element that is stiffened by a support tube 26 arranged within its interior. Inlet 102 of the fluid to be filtered runs on the outer side of filter element 10 between filter body 12 and filter housing 108. The fluid then passes through filter body 12 and flows centrally through outlet 104 back into the outlet nozzle of receiving means 32. Outlet 104 is sealed off against outlet nozzle 118 of a receiving means carrier 33 with a radial seal 19.

Filter system 100 according to the present invention can be attached by coupling device 30, which is connected with a corresponding seal arrangement 16, directly to a receiving means 32 external to the filter system which, for example, is situated on a die-cast head of an internal combustion engine. In this arrangement, filter system 100—which can be disposed hanging, standing or lying—is held on receiving means 32 with coupling device 30. If filter system 100 is applied, it is beneficial if seal 18 is joined directly to filter system 100 and thus cannot fall out and/or be damaged during assembly. Seal holder 16 may beneficially be connected to coupling device 30.

Coupling device 30 may be designed in the form of a bayonet joint so that coupling elements 36 arranged at coupling device 30, can slide into a coupling contour 34 located at receiving means 32 when filter system 100 is screwed into receiving means 32 and can slide into an end position 38 when filter system 100 is turned further. In this way, filter system 100 is locked in receiving means 32.

This assembly procedure is expediently supported by a bracing element 22 in the form of, for example, a compression spring that is attached to coupling device 30 and acts in axial direction L and, when the spring force is overcome, allows filter system 100 to slide into end position 38 and thereupon locks in this end position 38 by virtue of the spring prestress. Then, to unscrew filter system 100, the spring prestress must first be overcome again in order to allow coupling element 36 to slide out via coupling contour 34 and thereby enable filter system 100 to be removed from receiving means 32.

Coupling device 30 may expediently be made of a plastic, and thermoplastic materials, which permit a maximum surface pressure of up to 20 N/mm$^2$, can be used for lower mechanical requirements, whereas for higher mechanical requirements duromers, which permit a maximum surface pressure of up to 80 N/mm$^2$, can be used. Because coupling elements 36 are more heavily stressed when sliding in coupling contour 34, duromers represent a preferred embodiment. With these materials, coupling elements 36 may also be configured in any form that is advantageous for the structural design of coupling device 30 and coupling contour 34. Receiving means 32 can, for example, be made of aluminum, which has a higher strength than plastics, so that, even when a filter system 100 is attached and replaced multiple times, no signs of wear can appear at receiving means 32, which can be a component of the internal combustion engine.

Figure 2:
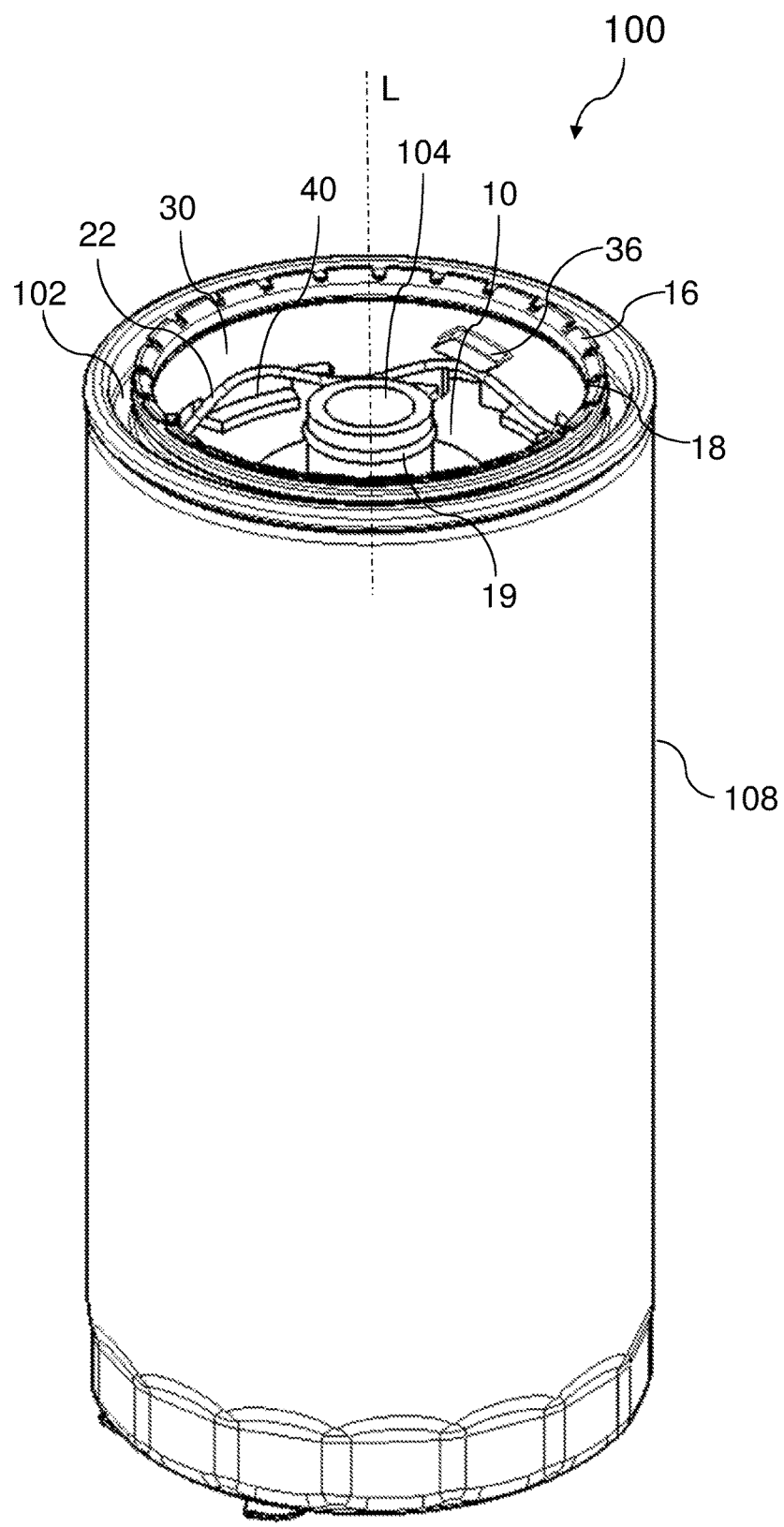
FIG. 2 is a perspective view of a filter housing having a seal holder, coupling device, and bracing element according to an exemplary embodiment of the present invention.

FIG. 2 shows a perspective view of a filter housing 108 having seal holder 16, coupling device 30, and bracing element 22 according to an exemplary embodiment of the present invention. Coupling device 30 provides a plurality of retaining elements 40 for holding bracing element 22, which, in the shown exemplary embodiment, are designed as a support for bracing element 22 when installed at receiving means 32. A plurality of coupling elements 36, which can engage in a corresponding coupling contour 34 of a receiving means 32, is recognizable on the inner side of coupling device 30. Outlet 104 is provided with a circumferential radial seal 19 for sealing against an outlet nozzle 118 of a receiving means carrier 33.

Figure 3:
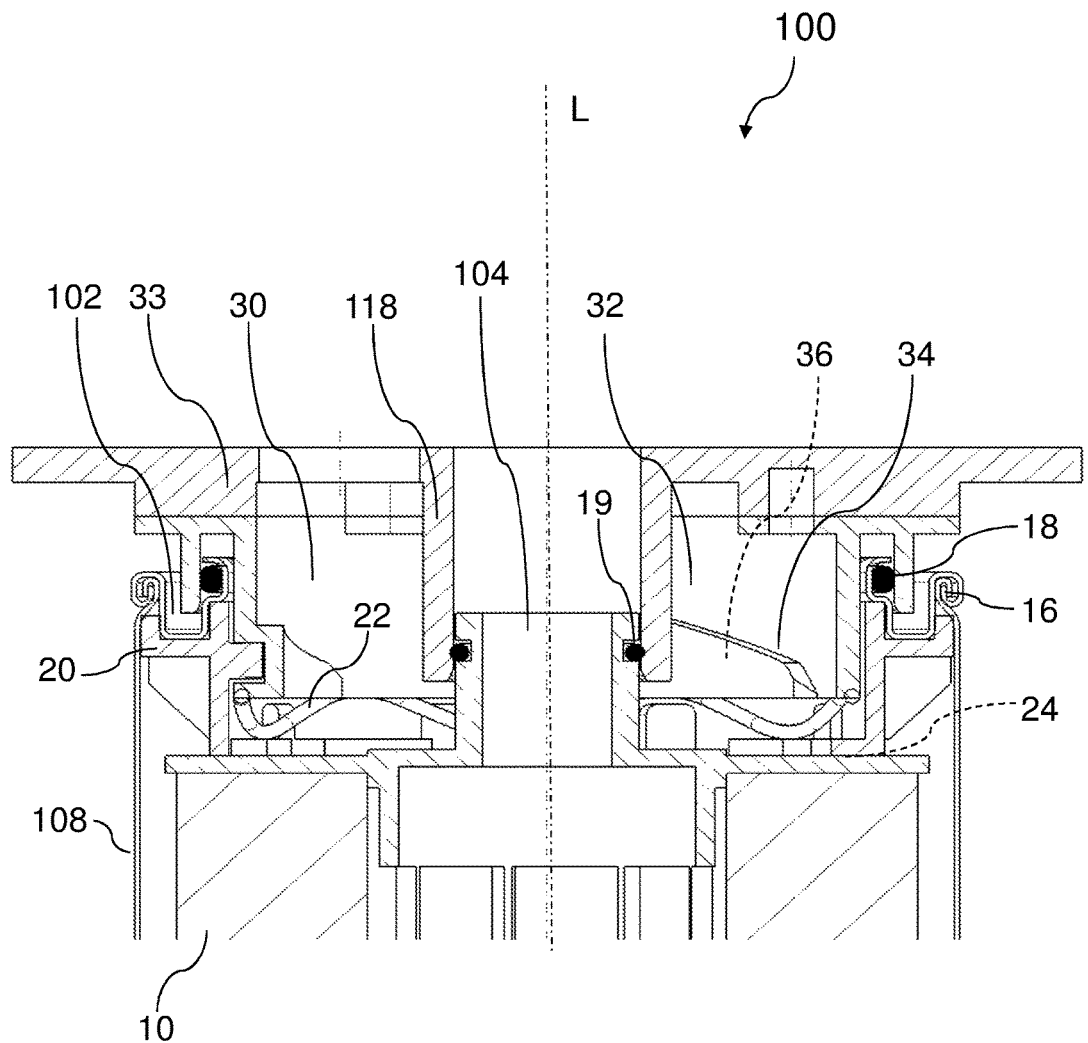
FIG. 3 is a longitudinal section of a filter system mounted at a receiving means according to an exemplary embodiment of the present invention.

FIG. 3 shows a longitudinal section of a filter system 100 mounted on a receiving means 32 according to an exemplary embodiment of the present invention. Receiving means 32 itself is attached to a receiving means carrier 33. Seal holder 16 provides one or a plurality of connecting elements 20 for the connection with coupling device 30. In the shown exemplary embodiment, a U-shaped groove in which seal holder 16 engages is designed as connecting element 20 of coupling device 30 and seal holder 16. The filter element 10 is arranged in filter housing 108 via a filter element holder 24 that is supported at coupling device 30.

In this way, FIG. 3 shows a combination of a filter system 100 and a receiving means 32, and receiving means 32 having a coupling contour 34 by means of which one or a plurality of coupling elements 36 of a coupling device 30 of filter system 100 are at least partially coupleable by a push-turn movement in an axial direction L.

Figure 4:
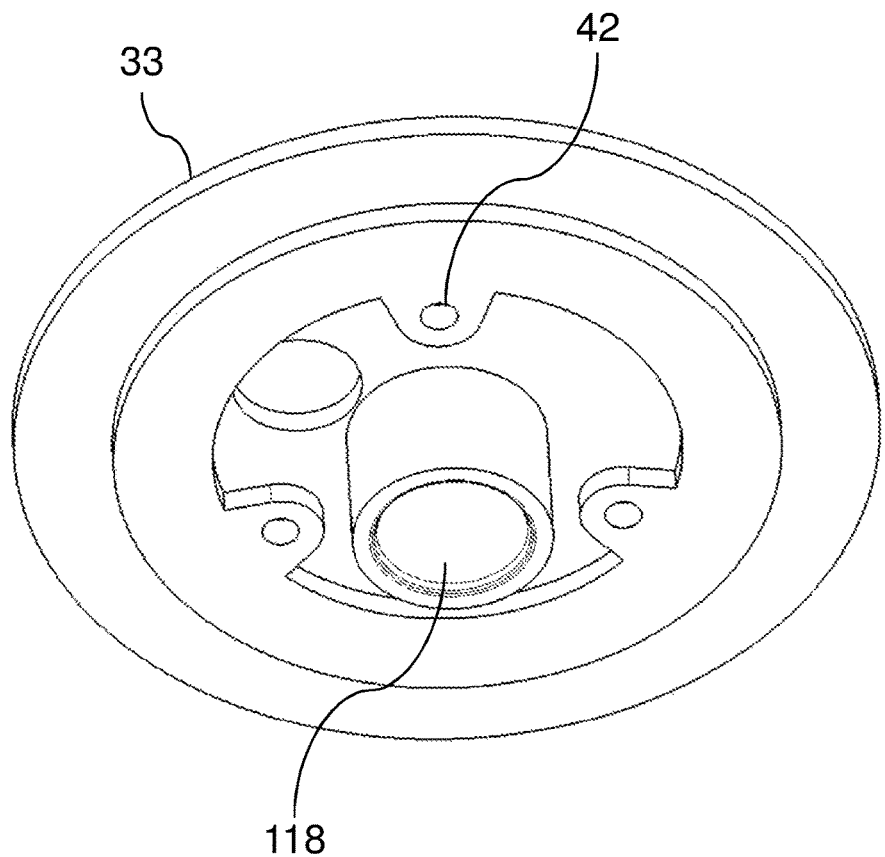
FIG. 4 is a perspective view of a receiving means carrier for a receiving means according to an exemplary embodiment of the present invention.

FIG. 4 shows a perspective view of a receiving means carrier 33 for a receiving means 32 according to an exemplary embodiment of the present invention having an outlet nozzle 118 for outlet 104 of filter system 100. Furthermore, three bores 42 are arranged in receiving means carrier 33 for the screw connection with receiving means 32.

Figure 5:
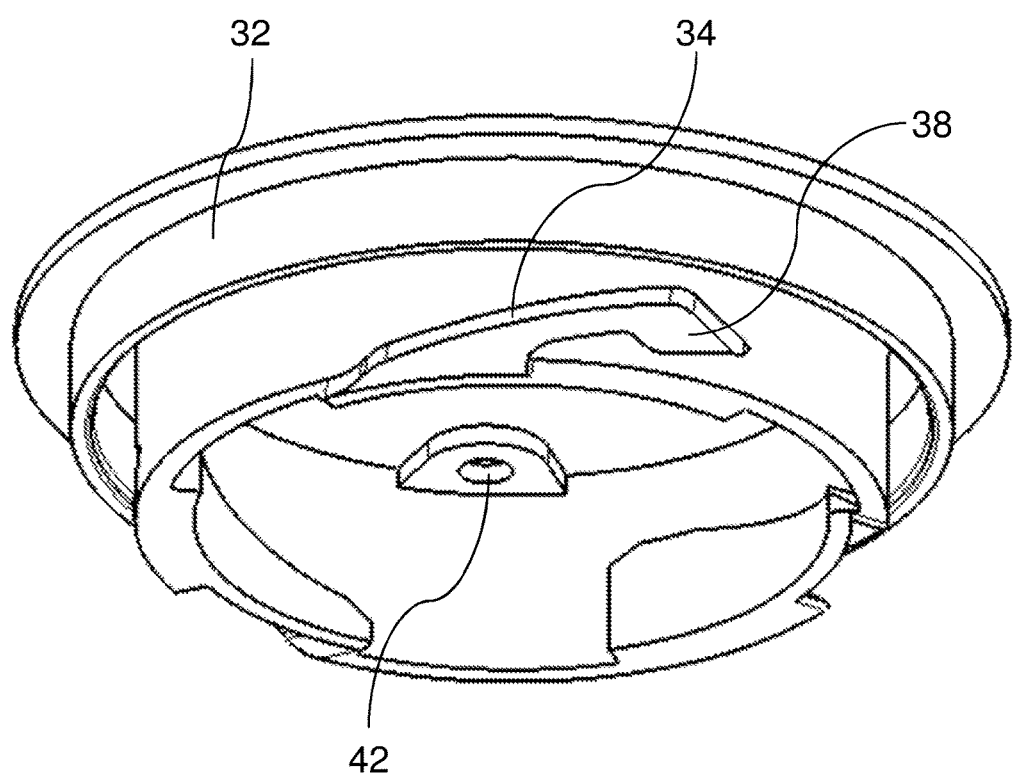
FIG. 5 is a perspective view of a receiving means according to an exemplary embodiment of the present invention.

FIG. 5 shows a perspective view of a receiving means 32 according to an exemplary embodiment of the present invention. Receiving means 32 has diagonally running coupling contours 34 into which coupling elements 36 of coupling device 30 can engage in order to arrive at end position 38 when it is turned and there latch and lock filter system 100. Three bores 42 are arranged on receiving means 32 for the connection with receiving means carrier 33.

Figure 6:
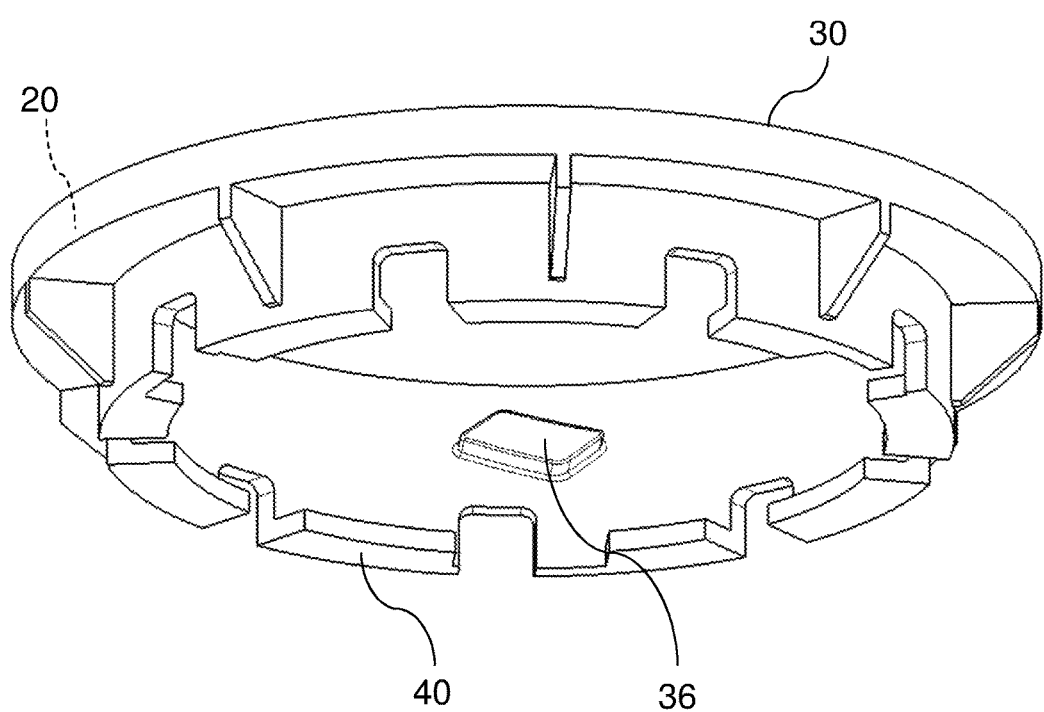
FIG. 6 is a perspective view of a coupling device according to an exemplary embodiment of the present invention; and, FIG. 7 is a perspective view of a bracing element according to an exemplary embodiment of the present invention.

FIG. 6 shows a perspective view of a coupling device 30 according to an exemplary embodiment of the present invention. Coupling device 30 comprises a circular ring on the inner side of which coupling elements 36 for engagement in coupling contour 34 and retaining elements 40 for holding bracing element 22 are arranged. Furthermore, a U-shaped groove is arranged as a connecting element 20 to seal holder 16.

Figure 7:
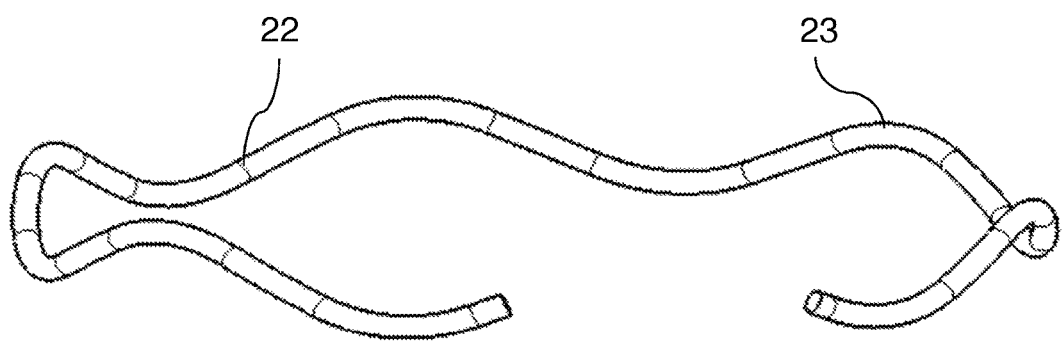

FIG. 7 shows a perspective view of a bracing element 22 according to an exemplary embodiment of the present invention. Bracing element 22 is represented in the shown exemplary embodiment as a wire bent into a circular shape with wavy raised points 23.

Beneficially, bracing element 22 can provide at least two raised points 23 in axial direction L. On the one hand, raised points 23 are the means by which the prestress force of bracing element 22 is applied and, on the other hand, raised points 23 have the advantage that when there is a failure of a raised point 23 due to, for example, a material breakage, additional raised points 23 are present in order to still maintain the function in the form of the prestress force of bracing element 22.

Figure 8:
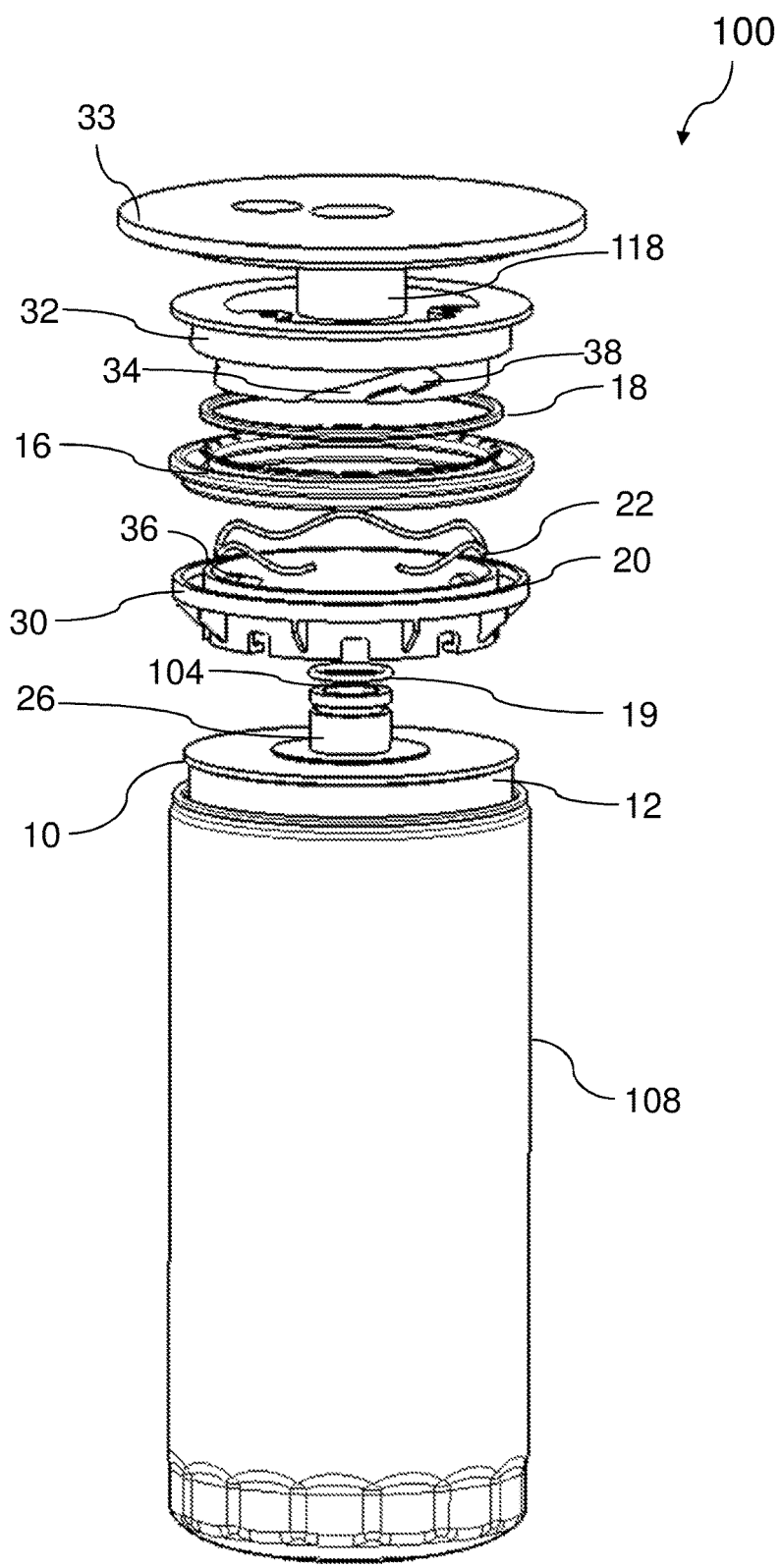
FIG. 8 is an exploded view of a filter system according to an exemplary embodiment of the present invention.

FIG. 8 shows an exploded view of a filter system 100 according to an exemplary embodiment of the present invention. The reciprocal engagement of the different assembly elements and the assembly sequence of the filter system can be recognized in this view.

A receiving means carrier 33, which is attached on an internal combustion engine and has an outlet nozzle 118 for the outlet of the filtered fluid, such as oil, from filter system 100 into the internal combustion engine, carries a receiving means 32 for a filter system 100. Filter system 100 comprises a filter element 10 having a filter body 12, which is arranged within a filter housing 108. The fluid to be filtered runs from outside between filter housing 108 and filter body 12 through filter body 12 into the interior area of the filter element and flows back out of filter element 10 through the support tube 26 at the upper end. Filter element 10 at the upper end is sealed off from a coupling device 30 that has coupling elements 36 for engagement and locking with coupling contours arranged in receiving means 32 and retaining elements 40 for supporting a bracing element 22 that braces filter system 100 and receiving means 32 against each other. In turn, filter system 100 is sealed off by seal holder 16, which is arranged in a groove-type connecting element 20 of coupling device 30, and which, on the one hand, carries seal 18 in the groove and, on the other hand, tightly seals filter system 100 with filter housing 108 via, for example, by a crimped rim.

Bracing element 22 is placed on the inner side of coupling device 30 on retaining element 40. Radial seal 19 seals support tube 26 on the outer side against outlet nozzle 118 of receiving means carrier 33 and, by doing so, outlet 104 of filter system 100. Filter system 100 is connected for assembly to receiving means 32 at an internal combustion engine. By twisting filter system 100 against receiving means 32, coupling elements 36 of coupling device 30 can engage in coupling contours 34 of receiving means 32 and thereby latch in the end positions 38 of coupling contours 34. In this arrangement, bracing element 22, which is disposed in coupling device 30 on retaining elements 40, is braced against receiving means 32.

Figure 9:
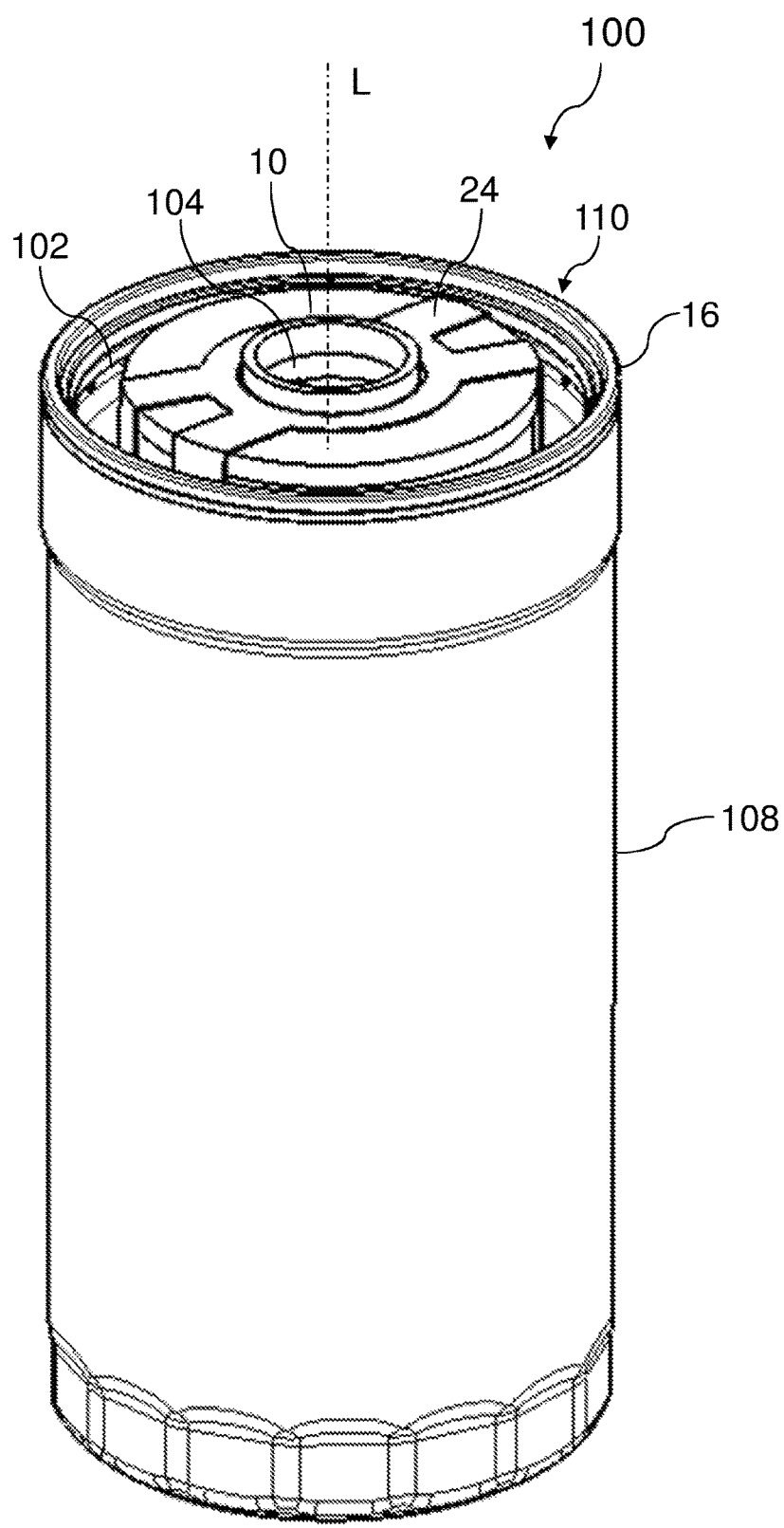
FIG. 9 is a perspective view of a filter system according to an exemplary embodiment of the present invention.

FIG. 9 is a perspective view of a filter system 100 according to another exemplary embodiment of the present invention. The filter system 100 for filtering a fluid having an end-face inlet 102 and outlet 104 includes a filter element 10, a filter housing 108, a coupling device 30 for coupling filter system 100 to a receiving means 32 external to the filter system, and a one-piece seal holder 16 with a seal 18 for sealing the filter system on the receiving means 32. The one-piece seal holder 16 includes the seal 18 substantially in a U-shape, wherein the one-piece seal holder 16 is connected at an end-face edge 110 of filter system 100 to the filter housing 108. The one-piece seal holder 16 is embodied as the end-face closure of filter system 100. Filter system 100 is provided to be used as a fuel filter.

Filter system 100 according to the present invention can be sealed with seal 18, for instance a one-piece O-ring seal that is U-shaped, that is, enclosed on three sides, in which seal holder 16 is arranged, directly against a receiving means 32 external to the filter, which receiving means is seated, for instance, on a pressure die-cast head of an internal combustion engine. In this arrangement, filter system 100—which can be disposed hanging, standing or lying—is held on receiving means 32 by coupling device 30. When filter system 100 is screwed on, it is beneficial if the seal 18 is connected directly to filter system 100 and, thus, cannot fall out and/or be damaged during assembly. Beneficially, seal holder 16 can be connected to coupling device 30.

It is advantageous for the function of filter system 100 if seal holder 16 is hydraulically sealed against the environment, that is, seal holder 16 is tightly connected to filter housing 108 and seal 18 is also hydraulically tightly sealed against seal holder 16. Normally standard leakages of a maximum of 0.5 Ncm$^3$/min are permitted in connection with test gases (for instance, helium or air under water). This means that the groove in the seal holder, in which groove the seal is positioned, typically cannot have any striations greater than 0.1 mm, and roughness Rz for the groove should be less than 40 µm.

One-piece seal holder 16, which is embodied for instance as a metal sheet, can be connected to filter housing 108 by welding, gluing, crimping, or other joining methods in order to create a permanently sealed and mechanically strong connection. The contour for holding seal 18 can be produced for instance by tapping, hydroforming, rolling, or similar forming methods, in order to create a one-piece seal holder 16 that includes a U-shaped receiving means 18 for the seal.

Figure 10:
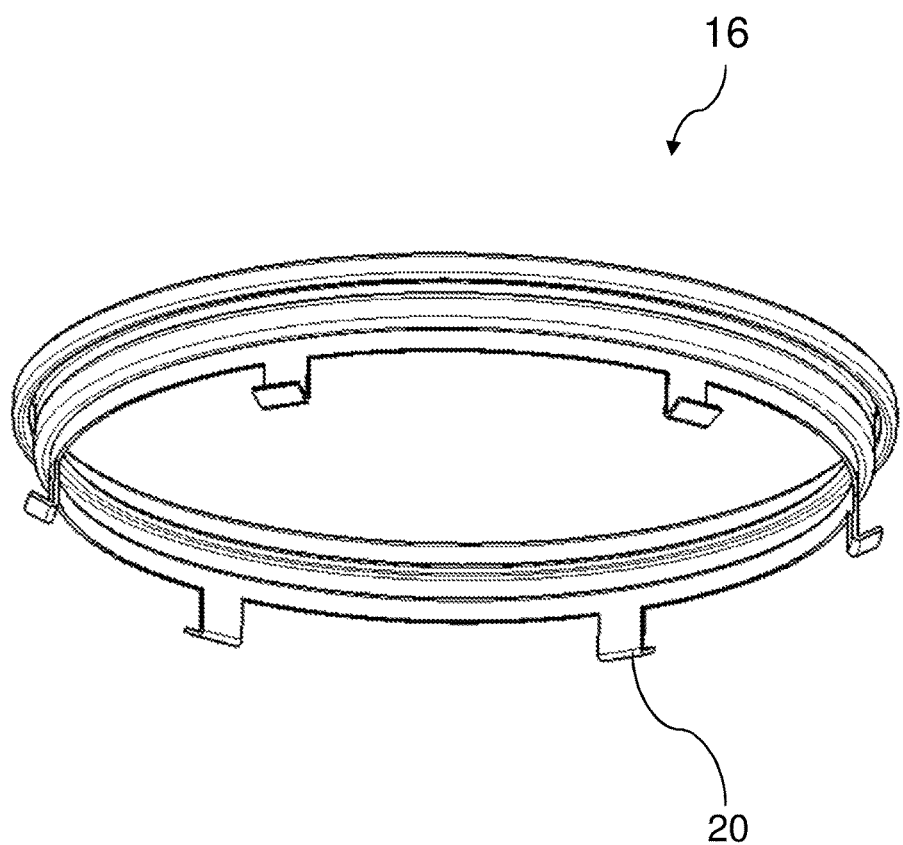
FIG. 10 is a perspective view of a seal holder according to an exemplary embodiment of the present invention.

FIG. 10 is a perspective view of a seal holder 16 according to an exemplary embodiment of the present invention. A plurality of connecting elements 20 for connecting to coupling device 30 are provided on one-piece seal holder 16. In the exemplary embodiment illustrated, these are hook-like connecting parts 20 that can latch into a coupling device.

Figure 11:
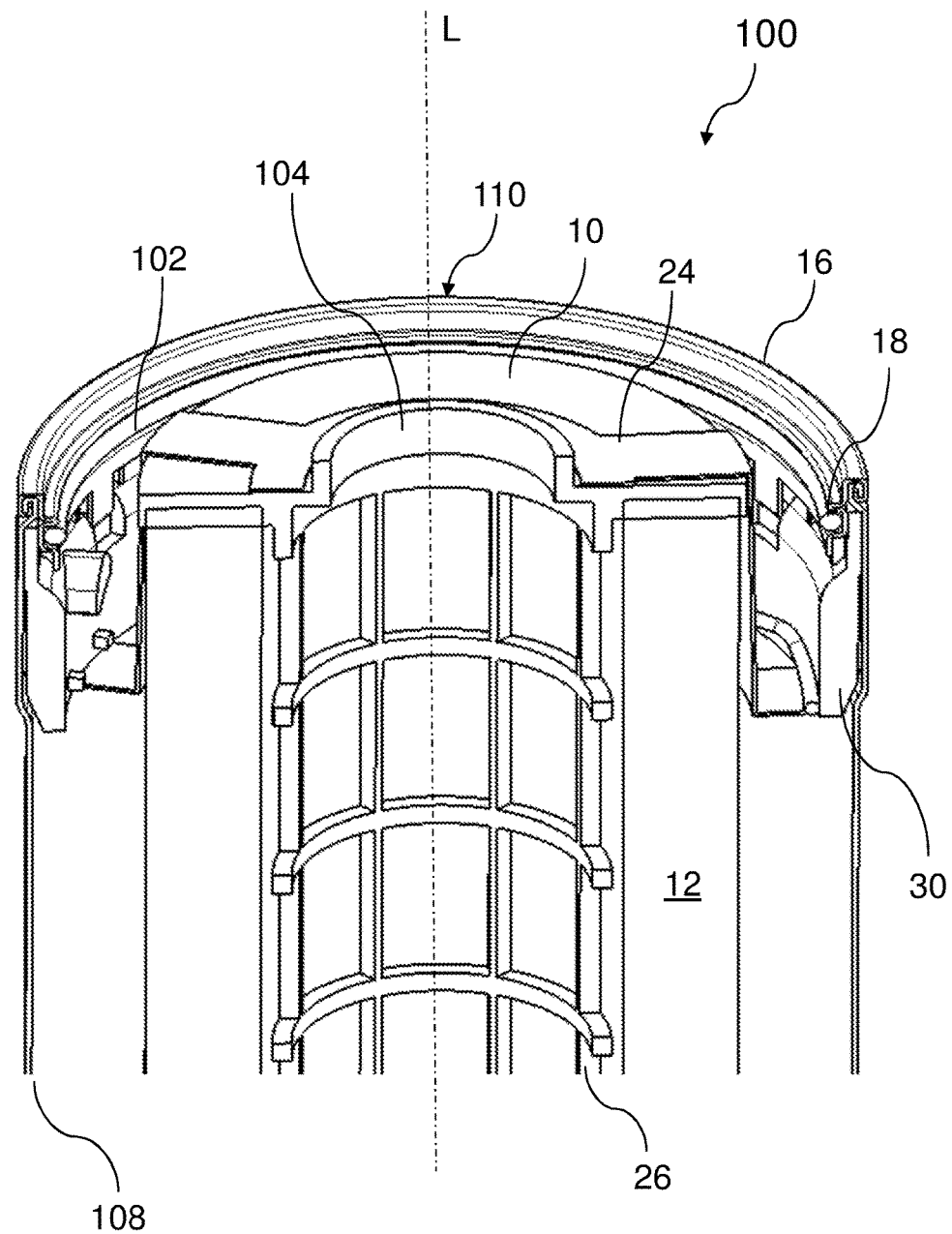
FIG. 11 depicts a sectional view of a filter system, focusing on seal holder and coupling device according to another exemplary embodiment of the present invention.

FIG. 11 is a sectional depiction of a filter system 100, focusing on seal holder 16 and coupling device 30, according to another exemplary embodiment of the present invention. When used according to specifications, seal 18 is positioned at least radially and axially against one-piece holder 16. One-piece seal holder 16 is joined to coupling device 12 in a positive fit. Filter element 10 is arranged in filter housing 108 via a filter element holder 24 that is supported on coupling device 30. Filter element holder 24 engages into the bottom side of the coupling device 30 so that filter element 10 is securely braced in filter housing 108. Filter element 10, which is substantially formed from a filter body 12, has in its interior a support tube 26 for reinforcement. Outlet 104 of filter system 100 runs in the interior of support tube 26, while inlet 102 runs tangentially between seal holder 16 and filter housing 108 on the one side and on the outer wall of filter element 10.

Figure 12:
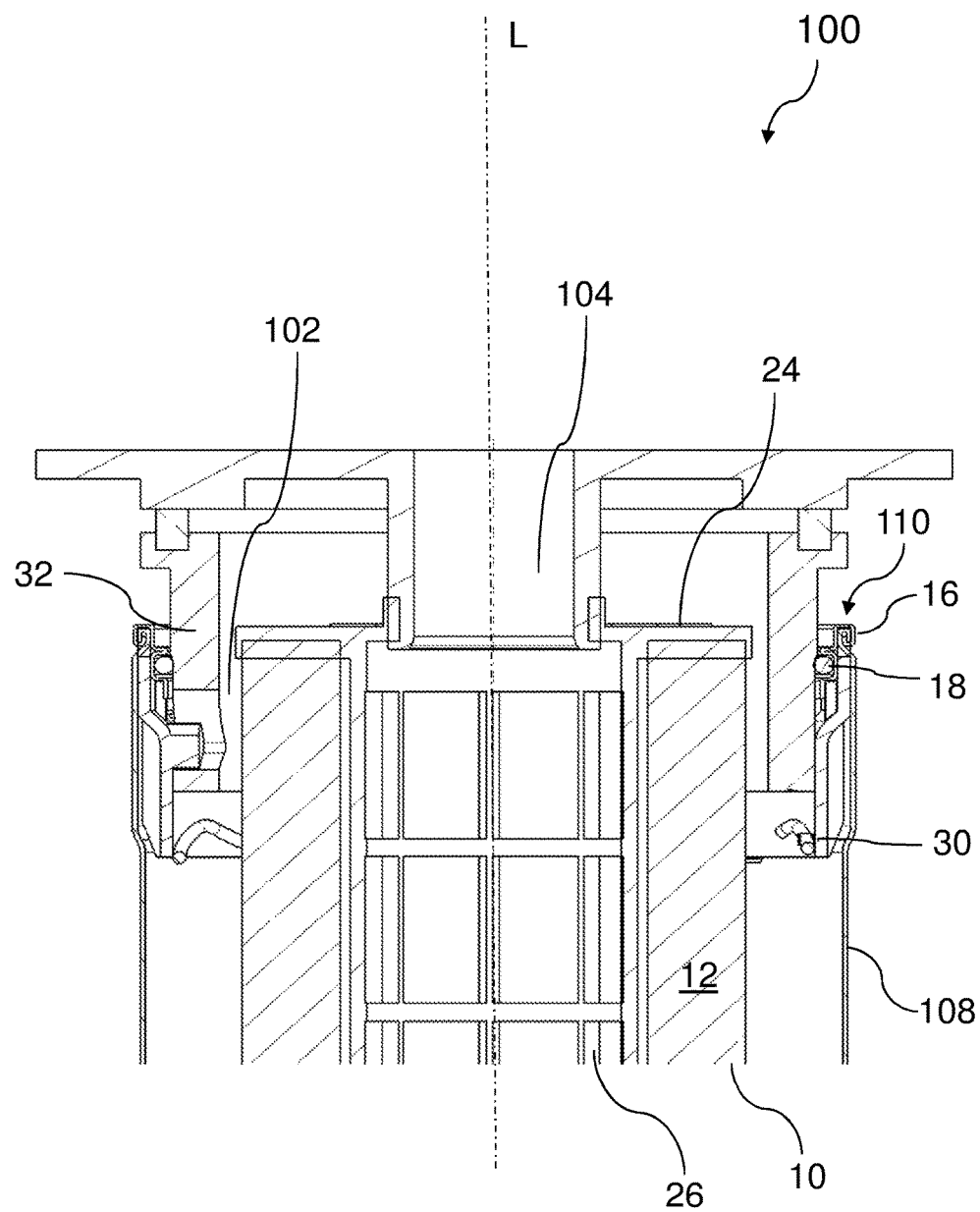
FIG. 12 is a longitudinal section of a filter system mounted at a receiving means according to an exemplary embodiment of the present invention.

FIG. 12 shows a longitudinal section of a filter system 100 mounted on a receiving means 32 according to an exemplary embodiment of the present invention. In this instance, filter system 100 is pushed onto receiving means 32, which is arranged for instance at an internal combustion engine, and is connected to this receiving means 32 via coupling device 30. Coupling device 30 includes a quick coupling, for instance, a bayonet joint. Coupling device 30 includes a bracing element 22 that, in the installed state, braces filter system 100 axially against receiving means 32. Bracing element 22 is not visible in the longitudinal section illustrated in FIG. 12; however, it can be seen in FIG. 15. Seal 18 has an inward sealing function radial to a longitudinal axis L, where seal 18 is positioned against a lateral surface of receiving means 32.

The arrangement in FIG. 12 thus depicts a combination of a filter system 100 and a receiving element 32, and filter system 100 having a one-piece seal holder 16 having a seal 18 for sealing the filter system at receiving means 32.

Figure 13:
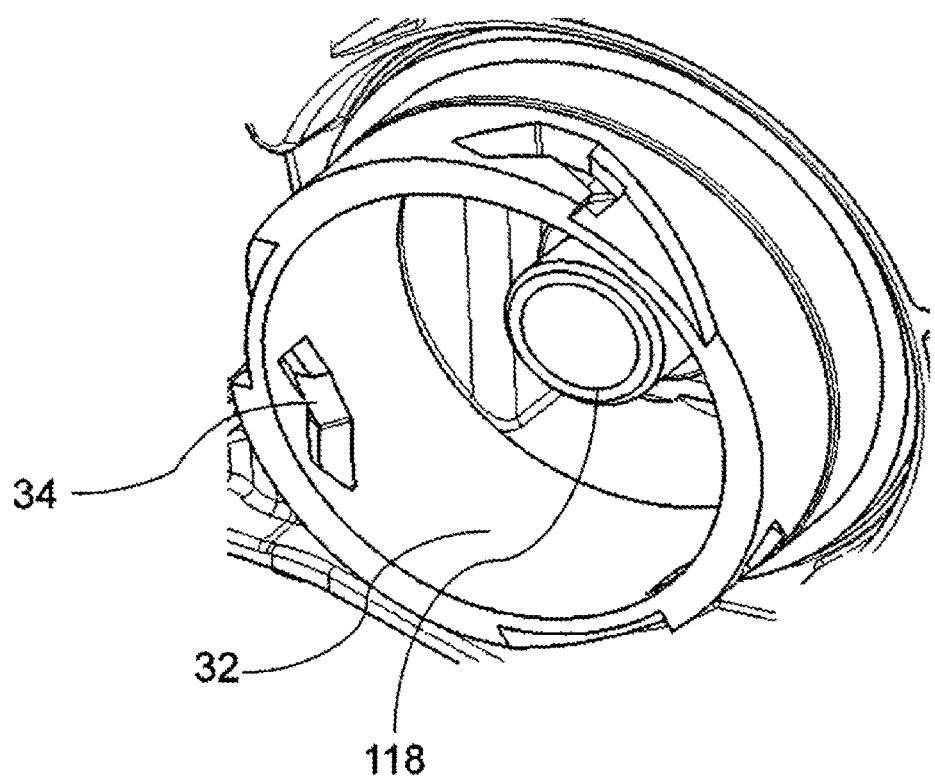
FIG. 13 is a perspective view of a part of an internal combustion engine having receiving means for a filter system according to an exemplary embodiment of the present invention.

FIG. 13 is a perspective view of a part of an internal combustion engine having receiving means 32 for a filter system 100 according to an exemplary embodiment of the present invention. Hollow cylindrical receiving means 32 has coupling contours 34 in which coupling elements 36 of a coupling device 30, for instance a cam of a bayonet joint, can engage and latch. In the center of receiving means 32 an outlet port may be seen that, when filter element 100 is installed, engages in support tube 26 of filter element 100 and thus connects outlet 104 of filter system 100 to the internal combustion engine.

Figure 14:
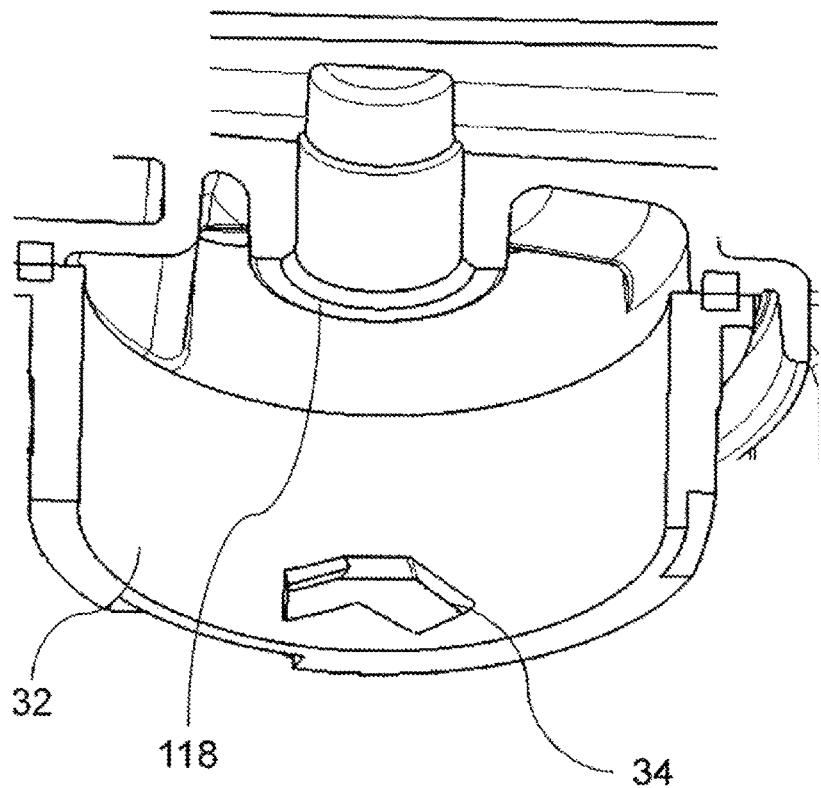
FIG. 14 is a sectional view of a receiving means for a filter system according to an exemplary embodiment of the present invention.

FIG. 14 illustrates a corresponding sectional depiction of a receiving means 32 for a filter system 100 as shown in FIG. 13.

Figure 15:
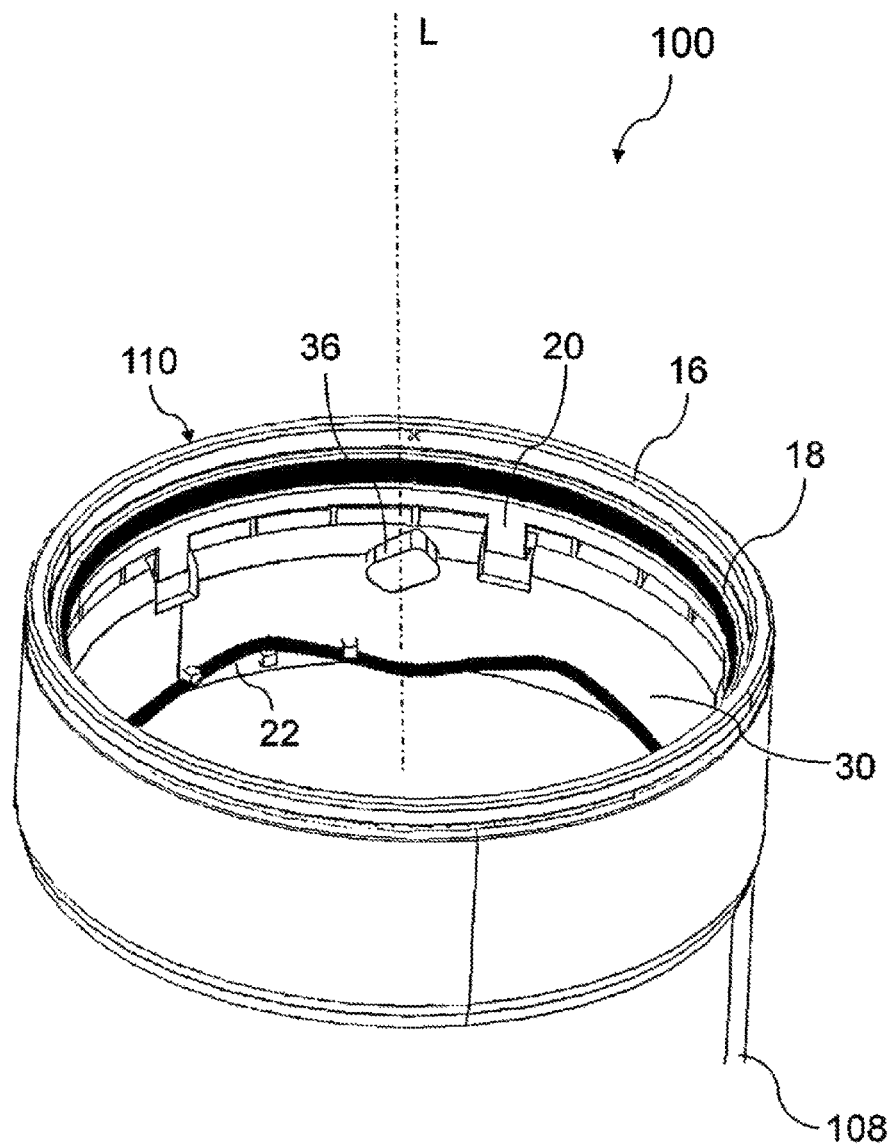
FIG. 15 is a perspective view of a filter housing having seal holder, coupling device, and bracing element according to another exemplary embodiment of the invention.

FIG. 15 is a perspective view of a filter housing 108 having seal holder 16, coupling device 30, and bracing element 22 according to another exemplary embodiment of the present invention. Inserted into seal holder 16 is a seal 18 that is surrounded in a U-shape by the contours of seal holder 16. Seal holder 16 is securely connected and latched to coupling device 30 by connecting elements 20. Coupling device 30 has on its inside coupling elements 36 of a quick coupling, of which one can be seen, that engage and latch into corresponding coupling contours 34 arranged on a receiving means 32. For securely bracing filter element 100 at receiving means 32, a bracing element 22, which can be formed, for instance, from spring steel wire, is also arranged on the inside of the coupling device.

Figure 16:
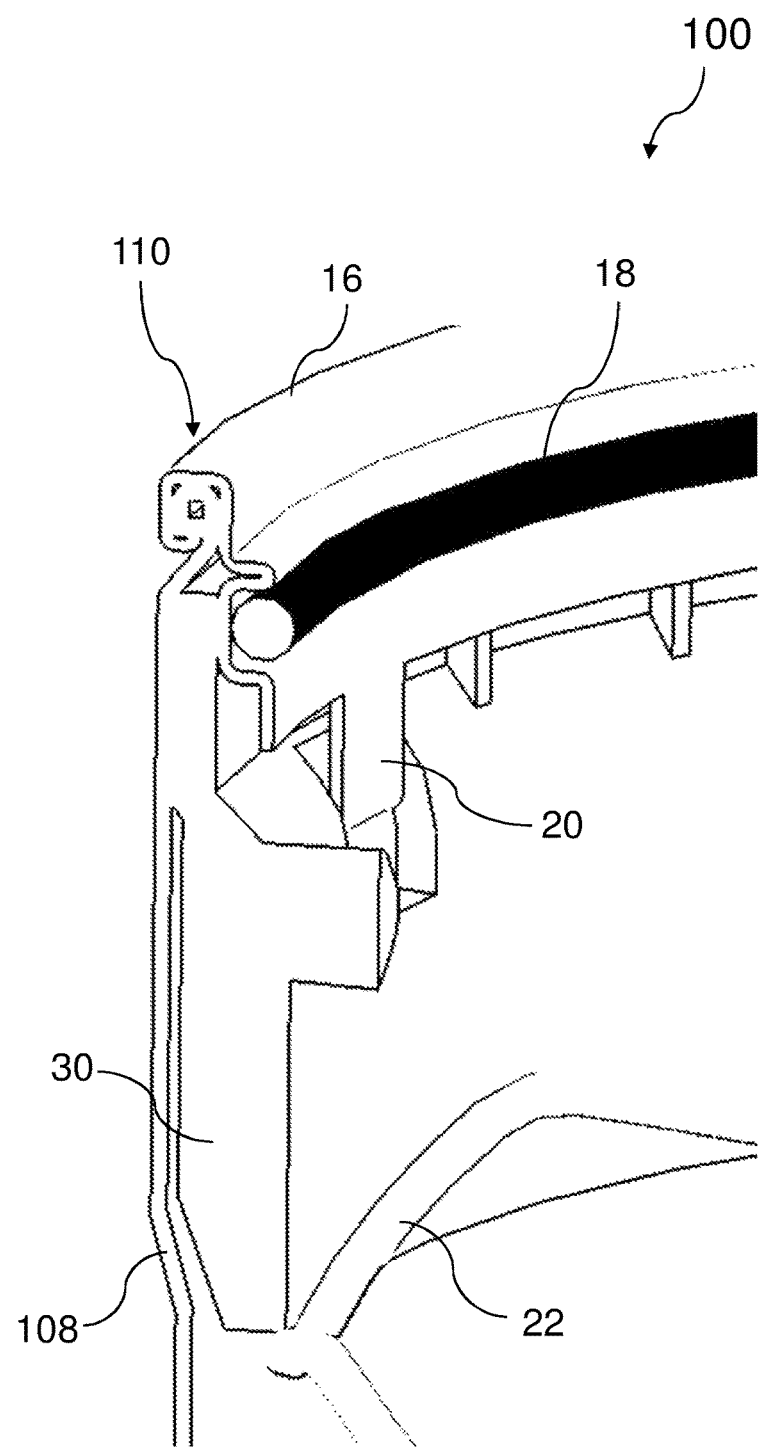
FIG. 16 depicts a sectional view of a seal holder and coupling device according to another exemplary embodiment of the present invention; and, FIG. 17 is another sectional depiction of seal holder and coupling device according to an exemplary embodiment of the present invention.

FIG. 16 is also a sectional depiction of seal holder 16 and coupling device 30 according to another exemplary embodiment of the present invention. It can clearly be seen how connecting elements 20 engage into coupling device 30. Furthermore, it can be seen how radially and axially acting seal 18 is disposed in the contour of one-piece seal holder 16 and how it is thereby surrounded in a U-shaped manner.

Figure 17:
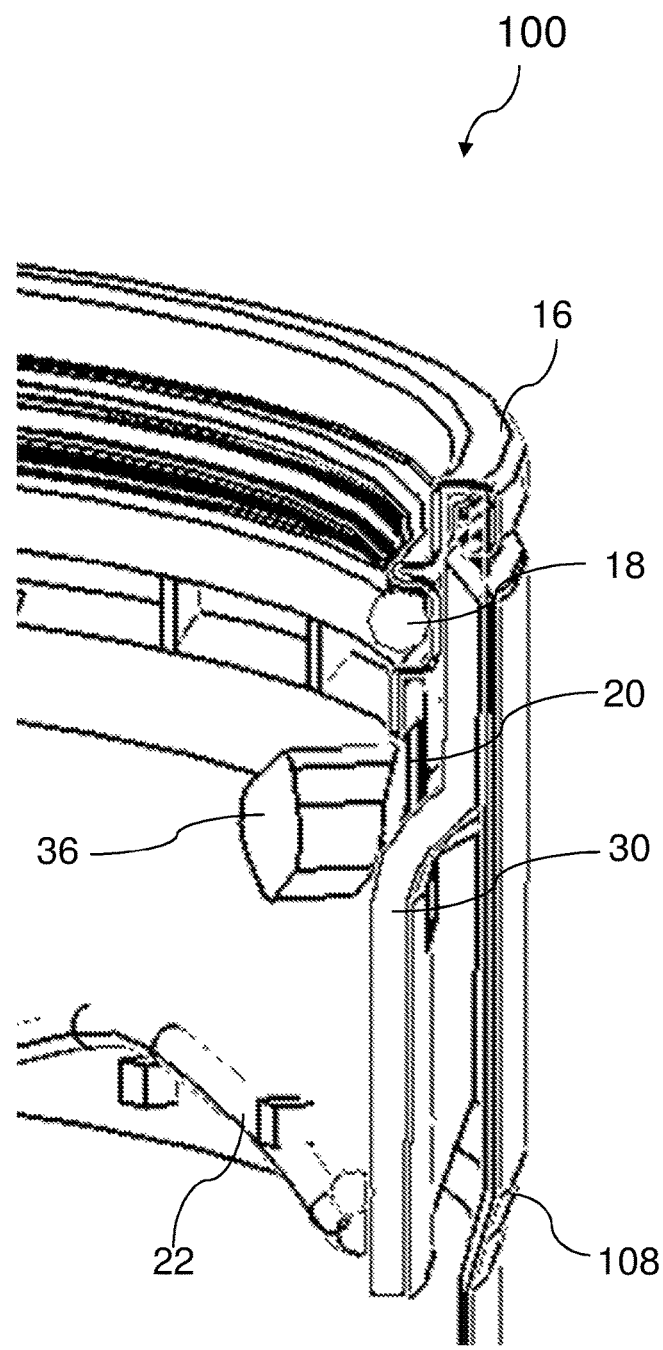

For this purpose, FIG. 17 shows another sectional depiction of seal holder 16 and coupling device 30 according to an exemplary embodiment of the present invention. Arranged on the inside of coupling device 30, for instance extruded thereonto, is a coupling element 20 and bracing element 22 for bracing the filter system 100 against the receiving means 32.

What is claimed is:

1. A filter system for filtering a fluid having an end face inlet and outlet, comprising:
   a filter housing;
   a filter element arranged in an interior of the filter housing, the filter element having:
      a hollow cylindrical filter body of a filter medium, the hollow cylindrical filter body surrounding a central longitudinal axis;
      a tubular outlet arranged directly on the hollow cylindrical filter body on an axial end face of the hollow cylindrical filter body, the tubular outlet projecting axially outwardly away from the filter element at a first axial end of the filter element, the tubular outlet opening into an interior of the hollow cylindrical filter body;
   a coupling device having:
      a first axially extending annular cylindrical wall surrounding the longitudinal axis of the filter element, a first axial end of the axially extending annular cylindrical wall positioned on the axial end face of the hollow cylindrical filter body, the axially extending annular cylindrical wall projecting axially outwardly away from the filter element, the first axial end of the axially extending annular cylindrical wall arranged on the axial end face of the hollow cylindrical filter body and radially surrounding the tubular outlet;
      an annular U-shaped circumferential groove formed on the first axially extending annular cylindrical wall and surrounding the central longitudinal axis;
      a plurality of radially inwardly projecting coupling elements formed on an interior surface of the first axially extending annular cylindrical wall of the coupling device and projecting into an interior of the first axially extending annular cylindrical wall, the plurality of radially inwardly projecting coupling elements spaced apart circumferentially about an inner circumference of the first axially extending annular cylindrical wall and configured to lockably engage with a plurality of locking contours of a receiving member when the filter system is lockably mounted by a push-turn movement relative to the receiving member;
   a seal holder arranged on the coupling device and having a seal configured to seal the filter system to the receiving member when the filter system is lockably mounted;
   a compression spring having one or more raised points, the compression spring arranged axially outside of the filter element in the interior of the first axially extending annular cylindrical wall of the coupling device and configured to apply an axial spring force against the receiving member and against the first axial end of the filter element.

2. The filter system according to claim 1, wherein
   the first axially extending annular cylindrical wall has at least one radially inwardly projecting retaining element projecting into the interior of the first axially extending annular cylindrical wall;
   wherein the compression spring contacts directly against the at least one radially inwardly projecting retaining element of the first axially extending annular cylindrical wall.

3. The filter system according to claim 2, wherein
   the at least one radially inwardly projecting retaining element of the first axially extending annular cylindrical wall is arranged directly on and contacting against the first axial end of the filter element.

4. The filter system according to claim 1, wherein
   the coupling device is connected to the seal holder.

5. The filter system according to claim 1, wherein
   the seal is radially arranged so that it radially seals the filter system against the receiving member in an installed state of the filter system on the receiving member.

6. The filter system according to claim 1, wherein
   the seal holder is one-piece and has a U-shaped portion in which the seal is arranged,
   wherein the one-piece seal holder is connected to the filter housing at an end face edge of the filter housing.

7. The filter system according to claim 6, wherein
   the seal is positioned at least radially and axially directly against the one-piece seal holder.

8. The filter system according to claim 6, wherein
   the seal has an inward sealing function radially relative to the longitudinal axis (L).

9. The filter system according to claim 6, wherein
   the one-piece seal holder is connected to the coupling device in a material fit, non-positive fit, or positive fit.

10. The filter system according to claim 1, wherein the seal holder is an end face closure of the filter system.

11. The filter system according to claim 1, wherein
   one or a plurality of connecting elements for connecting to the coupling device are provided at the seal holder.

12. The filter system according to claim 1, wherein
the filter element is arranged in the filter housing via a filter element holder that is supported against the coupling device.

13. A combination of the filter system according to claim 1 and the receiving member, wherein
the receiving member is configured to lockably engage and mount the filter element and the filter housing to the receiving member, the receiving member having:
a second axially extending annular cylindrical wall is configured to be received into the interior of the first axially extending annular cylindrical wall of the coupling device;
a plurality of locking contours formed in or on a radial outer side of the second axially extending annular wall and configured to lockably engage with the plurality of radially inwardly projecting coupling elements by a push-turn movement of the coupling device relative to the receiving member;
wherein each locking contour includes:
a ramped contour portion having a first end configured to receive a respective one of the inwardly projecting coupling elements;
a second end of the ramped contour having an end position formed as an axially outwardly extending contour configured to capture the respective one of the inwardly projecting coupling elements to lockably engage with the coupling device, the axial spring force of the compression spring holding the inwardly projecting coupling elements in the end position of the ramped contour.

\* \* \* \* \*